(12) United States Patent
Nagashima et al.

(10) Patent No.: US 10,240,976 B2
(45) Date of Patent: *Mar. 26, 2019

(54) MEASURING DEVICE, MEASURING METHOD, AND PROGRAMS THEREFOR

(71) Applicant: TOPCON CORPORATION, Itabashi-ku (JP)

(72) Inventors: Hiroki Nagashima, Itabashi-ku (JP); Atsushi Shoji, Itabashi-ku (JP); Akira Oide, Itabashi-ku (JP)

(73) Assignee: TOPCON CORPORATION, Itabashi-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,804

(22) Filed: Oct. 3, 2016

(65) Prior Publication Data

US 2017/0097260 A1    Apr. 6, 2017

(30) Foreign Application Priority Data

Oct. 5, 2015 (JP) ................. 2015-197594

(51) Int. Cl.

| | |
|---|---|
| *G01B 11/24* | (2006.01) |
| *G01J 1/42* | (2006.01) |
| *G01J 1/44* | (2006.01) |
| *G01J 1/02* | (2006.01) |
| *G01B 11/00* | (2006.01) |
| *G01S 17/42* | (2006.01) |
| *G01S 7/481* | (2006.01) |

(52) U.S. Cl.
CPC .......... *G01J 1/4257* (2013.01); *G01B 11/002* (2013.01); *G01J 1/0219* (2013.01); *G01J 1/0242* (2013.01); *G01J 1/0266* (2013.01); *G01J 1/44* (2013.01); *G01S 7/4817* (2013.01); *G01S 17/42* (2013.01)

(58) Field of Classification Search
CPC .... G01J 1/4204; G01J 1/42; G01J 1/44; G01J 2001/4247; G01S 17/08; G01S 17/42; G01B 11/00; G06T 17/00; G06T 7/0046; G06T 2207/10028
USPC .................. 356/121–123, 614–623
See application file for complete search history.

(56) References Cited

U.S. PATENT DOCUMENTS

| | | | | |
|---|---|---|---|---|
| 9,741,241 | B2* | 8/2017 | Mizui | ............... H04N 1/00323 |
| 9,823,354 | B2* | 11/2017 | Isozaki | ............... G01J 1/0219 |
| 10,067,233 | B2* | 9/2018 | Isozaki | ............... G01J 1/0219 |
| 2012/0133918 | A1* | 5/2012 | Sakimura | ............ G01C 15/002 |
| | | | | 356/4.01 |

(Continued)

FOREIGN PATENT DOCUMENTS

JP    8-15093    1/1996

*Primary Examiner* — Hoa Q Pham (74) *Attorney, Agent, or Firm* — Xsensus LLP (57) ABSTRACT

A technique for identifying a measurement planned position for electromagnetic waves in a three-dimensional space in a simple and easy manner is provided. A position of a measuring unit 200 that is carried by an operator 100 is measured by a position measuring device that is configured to measure a position by laser light. A positional relationship between the measured position and the position of a measurement planned position 601 is displayed on a terminal 300 that is carried by the operator 100. This display guides the operator 100, and the operator 100 identifies the measurement planned position 601 and measure illuminance thereat.

8 Claims, 10 Drawing Sheets

(56) References Cited

U.S. PATENT DOCUMENTS

| | | | |
|---|---|---|---|
| 2013/0152412 A1* | 6/2013 | Kumagai | G01C 15/004 |
| | | | 33/291 |
| 2014/0247439 A1* | 9/2014 | Neier | G01C 15/002 |
| | | | 356/4.01 |
| 2016/0377707 A1* | 12/2016 | Sasaki | G01S 7/497 |
| | | | 356/4.01 |
| 2017/0023351 A1* | 1/2017 | Isozaki | G01J 1/0219 |
| 2017/0023403 A1* | 1/2017 | Isozaki | G01J 1/4204 |
| 2017/0097262 A1* | 4/2017 | Nagashima | G01B 11/00 |
| 2017/0097420 A1* | 4/2017 | Nagashima | G01S 17/42 |
| 2017/0115161 A1* | 4/2017 | Nagashima | G01J 1/0242 |

* cited by examiner

MEASURING DEVICE, MEASURING METHOD, AND PROGRAMS THEREFOR

BACKGROUND OF THE INVENTION

Technical Field

The present invention relates to a technique for measuring electromagnetic waves.

Background Art

For example, a technique for testing the performance of a headlight of a vehicle is publicly known. Such a technique is disclosed in Japanese Unexamined Patent Application Laid-Open No. 8-015093, for example.

A method for testing the performance of a headlight of a vehicle includes a method of setting multiple measurement planned positions in front of a vehicle and measuring illuminance at each of the measurement planned positions. In this method, operations for identifying each of the measurement planned positions are necessary. Since the measurement planned positions are set in a three-dimensional space, the operations for identifying the measurement planned positions tend to be complicated.

SUMMARY OF THE INVENTION

In view of these circumstances, an object of the present invention is to provide a technique for identifying measurement planned positions for electromagnetic waves in a three-dimensional space in a simple and easy manner.

A first aspect of the present invention provides a measuring device including a controlling unit that is configured to control displaying of a relationship between a three-dimensional position of a measurement planned position and a three-dimensional position of an electromagnetic wave measuring device, on a display. In this case, the measurement planned position is set as a candidate at which electromagnetic waves are measured by the electromagnetic wave measuring device. The three-dimensional position of the electromagnetic wave measuring device is measured by a position measuring device.

According to a second aspect of the present invention, in the invention according to the first aspect of the present invention, the controlling unit may control displaying of a direction and a distance to the measurement planned position.

According to a third aspect of the present invention, in the invention according to the first or the second aspect of the present invention, the measuring device may also include a notification controlling unit that is configured to control displaying of a notice when a distance between the measurement planned position and the three-dimensional position of the electromagnetic wave measuring device is not greater than a predetermined value.

According to a fourth aspect of the present invention, in the invention according to any one of the first to the third aspects of the present invention, the measuring device may also include a point cloud position data obtaining unit and a position calculating unit. The point cloud position data obtaining unit is configured to obtain point cloud position data of an object that has a generation source of the electromagnetic waves. The position calculating unit is configured to calculate a position of the position measuring device with respect to the object based on a three-dimensional model of the object. The three-dimensional model of the object is generated based on a positional relationship between the measurement planned position and the object and based on the point cloud position data.

According to a fifth aspect of the present invention, in the invention according to the fourth aspect of the present invention, the position measuring device may have a laser scanner function, and the point cloud position data may be obtained by the laser scanner function.

According to a sixth aspect of the present invention, in the invention according to the fourth or the fifth aspect of the present invention, the position calculating unit may calculate the position of the position measuring device with respect to the object based on a matching relationship between the object and the three-dimensional model.

According to a seventh aspect of the present invention, in the invention according to the sixth aspect of the present invention, the position calculating unit may perform processing for calculating coordinates of positions of multiple points constituting the three-dimensional model, from the matching relationship, and may perform processing for calculating the position of the position measuring device by a backward intersection method, based on the coordinates of the multiple points.

An eighth aspect of the present invention provides a measuring method including setting a measurement planned position as a candidate at which electromagnetic waves are measured by an electromagnetic wave measuring device, measuring a three-dimensional position of the electromagnetic wave measuring device by a position measuring device, and controlling displaying of a relationship between a three-dimensional position of the measurement planned position and the three-dimensional position of the electromagnetic wave measuring device, on a display.

A ninth aspect of the present invention provides a computer program product including a non-transitory computer-readable medium storing computer-executable program codes for measurement. The computer-executable program codes include program code instructions for setting a measurement planned position as a candidate at which electromagnetic waves are measured by an electromagnetic wave measuring device, measuring a three-dimensional position of the electromagnetic wave measuring device by a position measuring device, and controlling displaying of a relationship between a three-dimensional position of the measurement planned position and the three-dimensional position of the electromagnetic wave measuring device, on a display.

According to the present invention, measurement planned positions for electromagnetic waves are identified in a three-dimensional space by a simple and easy method.

PREFERRED EMBODIMENTS OF THE INVENTION

1. First Embodiment

Outline

Figure 1:
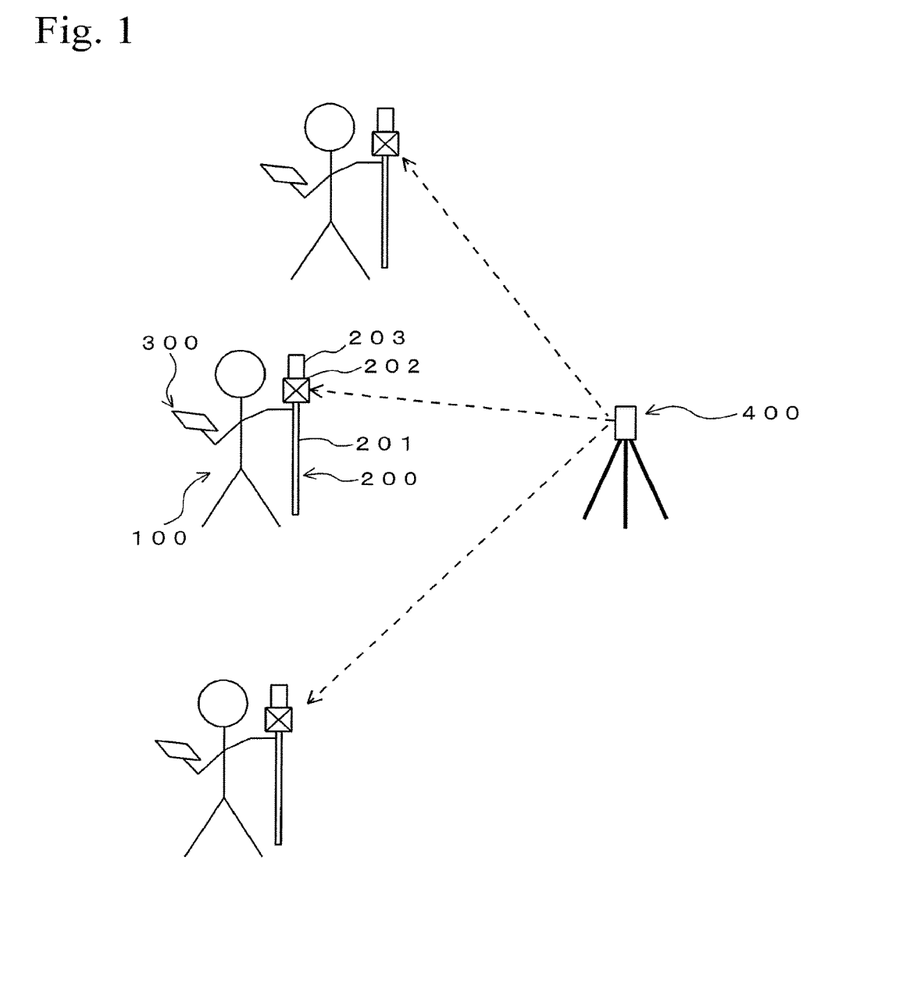
FIG. 1 is a conceptual diagram showing an outline of work for measuring illuminance.

FIG. 1 shows an outline of work for measuring illuminance in an embodiment. In this embodiment, an operator 100 measures illuminance at a predetermined measurement planned position by using a measuring unit 200. FIG. 1 conceptually shows an example of a case in which the operator 100 moves carrying the measuring unit 200 and a terminal 300 for measuring at three points.

Structure of Hardware (1) Measuring Unit

The measuring unit 200 includes a rod-like support pole 201, a reflective prism 202 that is fixed on a top of the support pole 201, and an illuminometer 203 that is fixed on the reflective prism 202. The support pole 201 is extendable, and the operator can adjust the heights of the reflective prism 202 and the illuminometer 203 to desired positions. The support pole 201 can be extended and retracted by a structure that is manually operated by the operator. Alternatively, the extending and the retracting of the support pole 201 may be performed by each type of actuator or an electric motor.

The reflective prism 202 reflects measurement laser light to a position measuring device 400. The measurement laser light is emitted from the position measuring device 400. The illuminometer 203 is an example of an electromagnetic wave measuring device and measures illuminance of light of lighting equipment. The illuminometer 203 is connected to the terminal 300, which is carried by the operator, and the illuminometer 203 operates by control via the terminal 300. Illuminance data measured with the illuminometer 203 is stored in the terminal 300. The illuminometer 203 has directivity in a specific direction in a horizontal plane. The measuring direction of the illuminometer 203 is adjusted by rotating the support pole 201 around its axis. In some cases, the terminal 300 may be mounted on the support pole 201 so that the terminal 300 will move together with the measuring unit 200.

(2) Position Measuring Device

The position measuring device 400 emits measurement laser light to the surroundings while scanning. The measurement laser light hitting the reflective prism 202 is reflected thereat, and the reflected light is received by the position measuring device 400. The position measuring device 400 calculates a direction and a distance from the position measuring device 400 to the reflective prism 202 based on the emitting direction and propagation time of the measurement laser light. Thus, a relative positional relationship of the reflective prism 202 with respect to the position measuring device 400 is determined. The position of the position measuring device 400 is determined in advance so that information of the position of the reflective prism 202 will be obtained. In this embodiment, the position of the position measuring device 400 is determined in advance in a measurement field, that is, a measurement target place, in which illuminance of headlights and taillights of a vehicle is to be measured. Details of this illuminance measurement are described later. For example, one or multiple reference points of which positions are precisely determined are provided in the measurement field, and the position measuring device 400 is arranged at the reference point. Thus, the position of the position measuring device 400 in the measurement field is preliminarily known. Alternatively, the position of the position measuring device 400 may be preliminarily measured by using a high precision GNSS device or the like.

Figure 2:
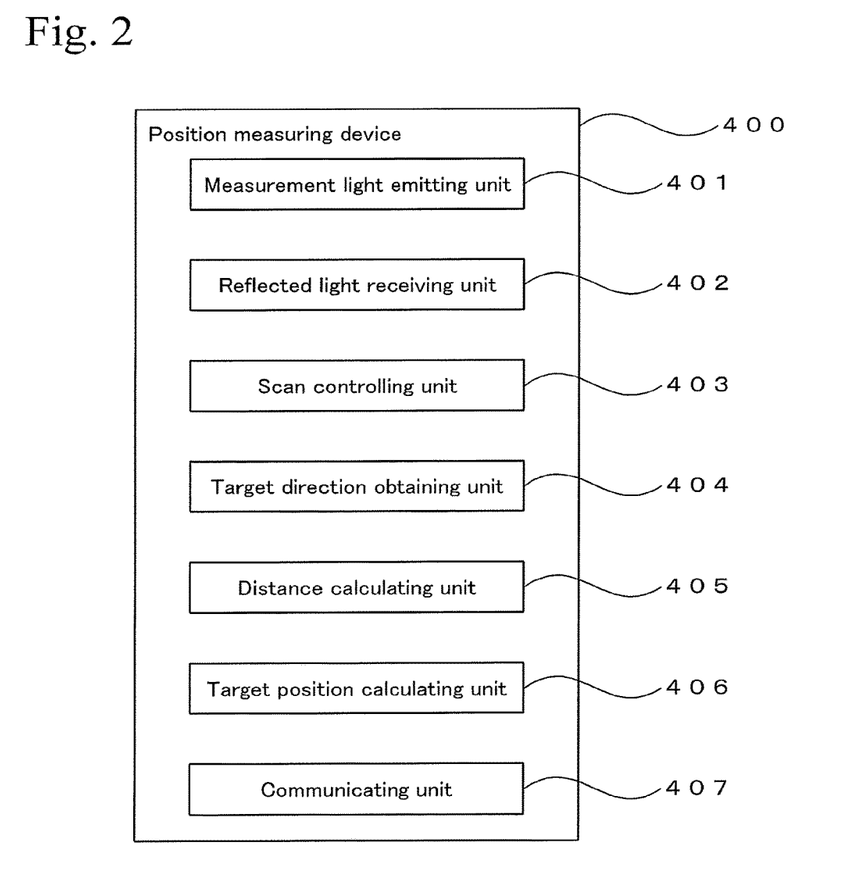
FIG. 2 is a block diagram of a position measuring device of an embodiment.

FIG. 2 shows a block diagram of the position measuring device 400. The position measuring device 400 includes a measurement light emitting unit 401, a reflected light receiving unit 402, a scan controlling unit 403, a target direction obtaining unit 404, a distance calculating unit 405, a target position calculating unit 406, and a communicating unit 407. The measurement light emitting unit 401 emits distance measurement laser light to the surroundings while scanning. The reflected light receiving unit 402 receives measurement light that has hit a target and that is reflected thereat. The target is the reflective prism 202 shown in FIG. 1. The measurement light emitting unit 401 and the reflected light receiving unit 402 are mounted on a rotatable table, whereby both emission of the measurement light and reception of the reflected light can be performed while the surroundings are scanned.

The scan controlling unit 403 controls the scanning using the measurement light. For example, the scan controlling unit 403 controls scan timing, scan direction, and emission timing of the measurement laser light. The target direction obtaining unit 404 obtains a direction of the target (in this case, the reflective prism 202) as viewed from the position measuring device 400, based on the emitting direction of the measurement light or the incident direction of the reflected light. In this embodiment, the target direction obtaining unit 404 obtains data of a horizontal angle and a vertical angle (elevation angle or depression angle). The distance calculating unit 405 calculates a distance from the position measuring device 400 to the target based on a flight time (propagation time) and the speed of the measurement light.

The target position calculating unit 406 calculates the position of the target with respect to the position measuring device 400 based on the direction of the target as viewed from the position measuring device 400 and based on the distance between the position measuring device 400 and the target. Here, in a condition in which the position of the position measuring device 400 in the measurement field is already known, the position of the target (reflective prism 202 in FIG. 1) in the measurement field is determined.

For example, it is assumed that a position $P_0(x', y', z')$ of the position measuring device 400 in the measurement field is known and that data of this known position is input in the position measuring device 400. In this case, a three-dimensional coordinate system having an origin at the position of the position measuring device 400 is used. Then, a measured position of the reflective prism 202 in the three-dimensional coordinate system is represented by $P_1(x, y, z)$, and a position (coordinates) P of the reflective prism 202 in the measurement field is calculated from the formula; $P=P_0+P_1$. This calculation is also performed by the target position calculating unit 406. Alternatively, the value of $P_0$ may be preliminarily input in the terminal 300, and the calculation for obtaining the position P may be performed by the terminal 300.

In a case in which the absolute position of the position measuring device 400 is known, the absolute position of the target is calculated. In this embodiment, the reflective prism 202 and the illuminometer 203 are arranged close to each other, and thus, the position of the reflective prism 202 is treated as the position of the illuminometer 203.

The communicating unit 407 wirelessly communicates with the terminal 300. Any wireless communication standard can be used. For example, a communication standard such as Wi-Fi, Bluetooth (registered trademark), various types of wireless LANs, mobile phone network, or the like, may be used. The communicating unit 407 transmits data of the position of the target (the reflective prism 202 in FIG. 1) to the terminal 300. The data of the position of the target is calculated by the target position calculating unit 406. The data of preliminarily calculated or predetermined position of the position measuring device 400 is input in the position measuring device 400 via the communicating unit 407.

(3) Terminal

As shown in FIG. 1, the operator 100 carries the terminal 300. The terminal is a commercially available tablet that can be used as a mobile general purpose computer, and the terminal includes a CPU, a memory, and various types of interfaces. A dedicated terminal may be prepared and be used for the terminal 300 instead of using a general purpose computer. The operator 100 performs work relating to illuminance measurement by using the terminal 300.

Figure 3:
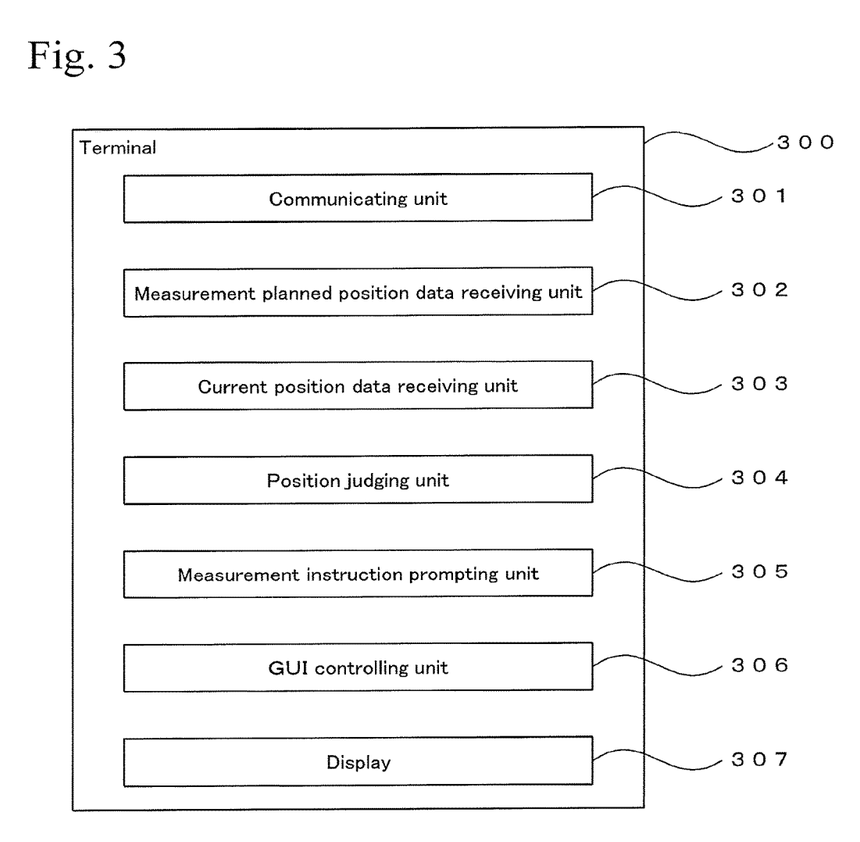
FIG. 3 is a block diagram of a terminal of an embodiment.

The terminal 300 includes a communicating unit 301, a measurement planned position data receiving unit 302, a current position data receiving unit 303, a position judging unit 304, a measurement instruction prompting unit 305, a GUI controlling unit 306, and a display 307. In this embodiment, the communicating unit 301 and the display 307 are constructed of hardware that is equipped on the tablet, and the other functional units are constructed by software and are operated such that the CPU executes specific programs.

At least one of the functional units shown in FIG. 3 may be composed of a dedicated circuit. For example, each of the functional units shown in FIG. 3 may be composed of electronic circuits such as a CPU (Central Processing Unit), an ASIC (Application Specific Integrated Circuit), and a PLD (Programmable Logic Device) such as an FPGA (Field Programmable Gate Array).

Whether each of the functional units is to be constructed of dedicated hardware or is to be constructed of software so that programs are executed by a CPU, is selected in consideration of necessary operating speed, production cost, amount of electric power consumption, and the like. For example, a specific functional unit composed of an FPGA provides a superior operating speed but is high in production cost. On the other hand, a specific functional unit that is configured so that programs are executed by a CPU can be made by using general purpose hardware and is thereby low in production cost. However, a functional unit constructed by using a CPU provides an operating speed that is inferior to the operating speed of dedicated hardware. Moreover, such a functional unit may not be able to perform complicated operation. Constructing the functional unit by dedicated hardware and constructing the functional unit by software differ from each other as described above, but are equivalent to each other from the viewpoint of obtaining a specific function. Alternatively, multiple functional units may be composed of one circuit.

The communicating unit 301 communicates with the position measuring device 400 (refer to FIGS. 1 and 2) and other devices. Each type of publicly known standards may be used as the communication standard. The measurement planned position data receiving unit 302 receives data of measurement planned positions, which are candidate positions at each of which illuminance is to be measured. The measurement planned positions at each of which illuminance is to be measured are determined in advance and are input in the terminal 300 via the communicating unit 301. Naturally, data of the measurement planned positions may be input in the terminal 300 via a publicly known storage medium, such as a USB memory or the like. The input data of the measurement planned positions is stored in a storage means (not shown) of the terminal 300, such as a semiconductor memory or the like.

The current position data receiving unit 303 receives data of a current position of the reflective prism 202, which is measured by the position measuring device 400. The data of the current position is received by the communicating unit 301 and is transmitted to the current position data receiving unit 303.

The position judging unit 304 compares the current position of the reflective prism 202, which is received by the current position data receiving unit 303, and the measurement planned position, which is determined in advance and is received by the measurement planned position data receiving unit 302. Then, the position judging unit 304 judges whether the difference between the current position and the measurement planned position is not greater than a predetermined range. After the position judging unit 304 judges this difference as being not greater than the predetermined range, the measurement instruction prompting unit 305 performs processing for notification to prompt the operator to measure illuminance.

The GUI controlling unit 306 controls a GUI (Graphical User Interface), which is described later. The GUI is controlled by using a function that is equipped on an ordinary tablet. The GUI controlling unit 306 controls a UI (User Interface) display, which is described later. The display 307 is a liquid crystal display unit that is equipped in the terminal 300. The display 307 includes a touch panel sensor so that various kinds of controls will be performed by using the screen. This function utilizes the function of a commercially available tablet.

Moreover, the terminal 300 has an internal or external attitude sensor and obtains its attitude in a measuring condition after being calibrated. Details of the calibration are described later.

Outline of Operation

The position measuring device 400 measures the position of a target, that is, the position of the reflective prism 202 shown in FIG. 1, and transmits this information to the terminal 300 through wireless communication. Then, the terminal 300 compares a predetermined measurement planned position and the current position of the reflective prism 202, which is measured by the position measuring device 400, and calculates a positional relationship therebetween. This positional relationship between the measurement planned position and the measured current position of the reflective prism 202 is graphically displayed on the display 307 of the terminal 300 (refer to FIGS. 4A to 4D).

Figure 4A:
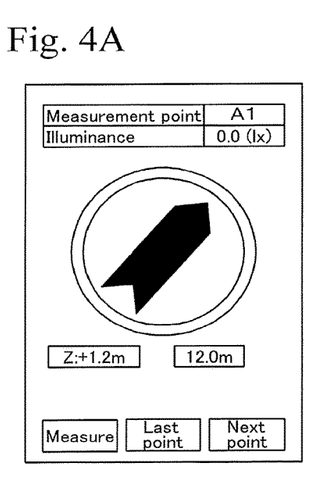
FIGS. 4A to 4D show examples of UI display screens.

After looking at an UI screen displayed on the display 307 of the terminal 300 as shown in FIG. 4A, the operator carrying the measuring unit 200 approaches the measurement planned position. Thereafter, when a specific condition is satisfied, the operator is prompted to measure illuminance by notification. The operator measures illuminance at the position, at which the operator has received the notification, by using the illuminometer 203 (refer to FIG. 1). These operations are performed for each of the measurement planned positions, whereby illuminance is measured at each of the measurement planned positions.

Examples of GUI Display Screens

FIGS. 4A to 4D show examples of GUI screens (UI screens) displayed on the display 307 of the terminal 300 (refer to FIG. 3). The GUI is controlled by using the screens as shown in FIGS. 4A to 4D and is performed by the GUI controlling unit 306. FIG. 4A shows a direction of the measurement planned position, a distance in a horizontal direction and a distance in a vertical direction to the measurement planned position, based on the position of the reflective prism 202 at that time. FIG. 4A shows a situation in which the measurement planned position exists at a position that is 12 meters in the horizontal oblique right forward direction by 45 degrees and 1.2 meters in the upward vertical direction apart from the reflective prism 202 at that time. Although details are described later, the terminal 300 has an attitude sensor, and displaying is controlled so that the direction of the display screen shown in each of FIGS. 4A to 4D corresponds to the surrounding condition. That is, displaying of an arrow is controlled so that a displayed arrow will point to the measurement planned position at any time regardless of the direction of the terminal 300.

Figure 4B:
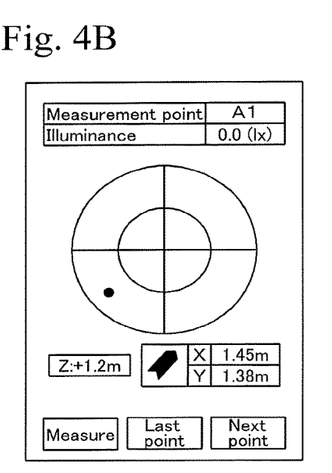

FIG. 4B shows a situation in which the reflective prism 202 comes to a position that is 1.45 meters in an X direction (right direction), 1.38 meters in a Y direction (front direction), and 1.2 meters in the upward vertical direction to the measurement planned position. In this case, by moving the reflective prism 202 1.45 meters in the X direction (right direction) and 1.38 meters in the Y direction (front direction) in addition to 1.2 meters in the upward vertical direction, the reflective prism 202 reaches the measurement planned position. The position of the reflective prism 202 and the position of the illuminometer 203 are close to each other and are thereby treated as being the same three-dimensional position. Accordingly, by moving the reflective prism 202 to the measurement planned position, the illuminometer 203 comes to be able to effectively measure illuminance at the measurement planned position.

Figure 4C:
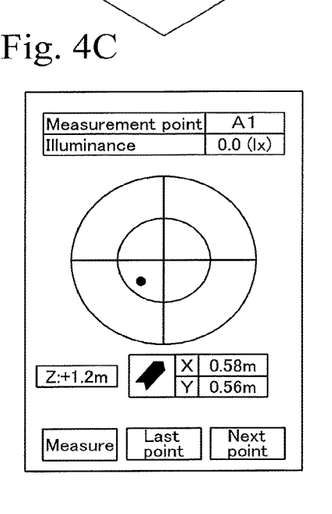

FIG. 4C shows a situation in which the reflective prism 202 comes to a position that is 0.58 meters in the X direction (right direction) and 0.56 meters in the Y direction (front direction) apart from the measurement planned position. FIG. 4C shows a situation in which the reflective prism 202 comes to a position that is 70 centimeters or less in the horizontal plane from the measurement planned position, but in which the reflective prism 202 still needs to move 1.2 meters in the upward vertical direction to the measurement planned position.

In these cases, the illuminance measurement is allowed to be performed at a position within a radius of 70 centimeters from the measurement planned position. Thus, when the horizontal distance between the current position of the reflective prism 202 and the measurement planned position is decreased to approximately 70 centimeters, a concentric circle indicating a radius of 70 centimeters is displayed so that approaching the measurement planned position will be recognized on the screen.

Figure 4D:
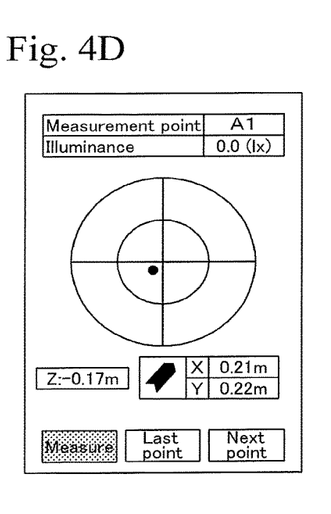

FIG. 4D shows a situation in which the reflective prism 202 comes to a position that is 0.17 meters beyond the measurement planned position in the vertical direction. The display of "−0.17 in" represents that the measurement planned position is lower than the reflective prism 202 by 0.17 meters. In this case, by lowering the reflective prism 202 by 0.17 meters, the reflective prism 202 comes to the same height as the measurement planned position. FIG. 4D shows a situation in which both the distance in the horizontal direction and the distance in the vertical direction of the reflective prism 202 are decreased to 70 centimeters or less. In this case, when the distance between the measurement planned position and the current position of the reflective prism 202 is decreased to 70 centimeters or less, the color or the gradation of the color at a part of the screen is changed, or highlighting such as blinking is performed, to notify the operator of being in close proximity to the measurement planned position. This notification may be performed by a sound or the like. FIG. 4D shows an example in which an icon for instructing measurement is highlighted. In this case, the illuminance measurement is performed with the illuminometer 203 after the operator touches the screen at the position corresponding to the highlighted part.

Example of Processing

Figure 5:
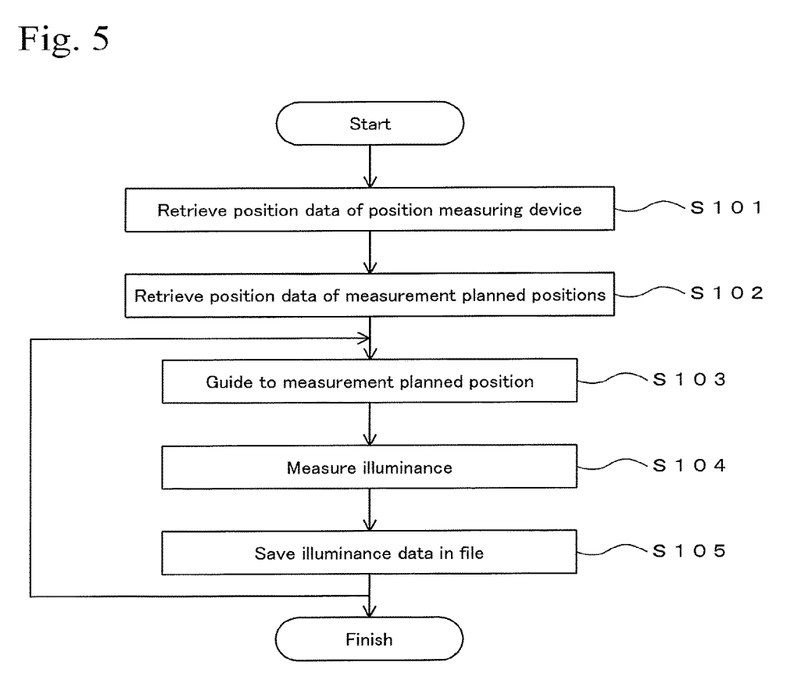
FIG. 5 is a flow chart showing an example of a processing procedure.

FIG. 5 shows a flow chart of an example of a processing procedure. Programs for executing the processing shown in FIG. 5 are stored in a memory of the terminal 300. Alternatively, the programs may be stored in an appropriate storage medium and may be provided therefrom. This is the same as in the case of processing shown in FIG. 7 or FIG. 9.

Figure 6A:
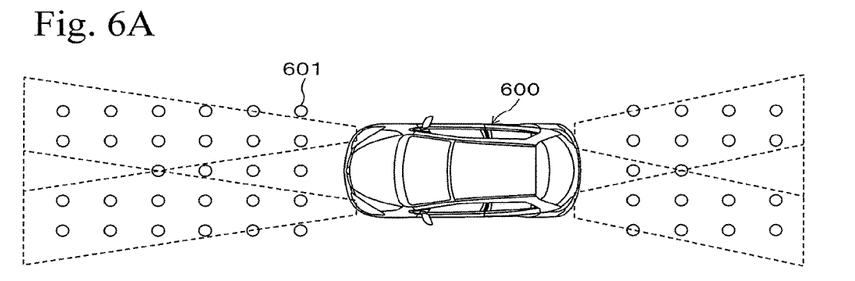
FIGS. 6A and 6B show an example of a situation for measuring illuminance.
Figure 6B:
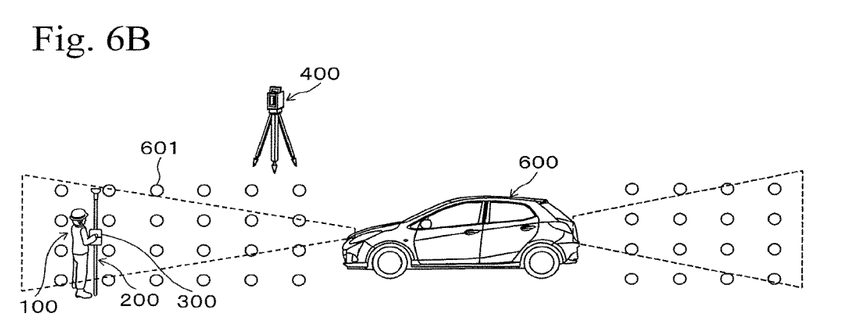

Here, an example of measuring illuminance of lights (headlights and taillights) of a vehicle 600 will be described. FIGS. 6A and 6B show a condition in which multiple measurement planned positions 601 are set in a grid in a three-dimensional space at a front side and a rear side of the vehicle 600. Although a passenger car is exemplified as a vehicle, a track, a bus, or a special vehicle such as a crane vehicle or the like, may be used.

Relative positional relationships of the measurement planned positions 601 shown in FIGS. 6A and 6B with respect to the vehicle 600, and grid spaces between the measurement planned positions, are determined in advance. For example, the measurement planned positions are determined when the vehicle is designed, and a lower limit and a range of a measured value of illuminance at each of the measurement planned positions are also determined in advance. Here, illuminance measurement is exemplified. However, a standard of chromaticity of light of lighting equipment may be specified, and for example, a range of the chromaticity at each of the measurement planned positions may be determined in advance. The measurement field where the measurement is performed, as shown in FIGS. 6A and 6B, may be set outdoor or indoor.

First, the position measuring device 400 is arranged at a known position before the measurement is performed. Then, the terminal 300 is calibrated so that the terminal 300 is prepared to measure a direction. The calibration processing is performed as described below. First, map information of the measurement field where the measurement is performed, as shown in FIGS. 6A and 6B, is input in the terminal 300. Then, a position of the terminal 300 is measured at each of multiple positions in the measurement field by using the position measuring device 400. In this operation, the terminal 300 is made close to the reflective prism 202, and then the position of the terminal 300 is measured. The attitude of the terminal 300 at each of the multiple positions is known by the attitude sensor equipped on the terminal 300. Thus, a relationship between the map information of the measurement field and the attitude of the terminal 300 is obtained. Consequently, the information as shown in FIGS. 4A to 4D is displayed on the display 307 of the terminal 300 while the direction of the screen image corresponds to the measurement field condition at any time. That is, the screen is displayed as shown in each of FIGS. 4A to 4D so that the direction of the measurement planned position is visually understood at any time even when the direction of the terminal 300 is changed.

Hereinafter, an example of an operation procedure is described with reference to FIG. 5. First, position data of the position measuring device 400 is input in the terminal 300 (step S101). The arranged position of the position measuring device 400 in the measurement field is already known, as described above, and data of the arranged position is input in the terminal 300. Then, data of predetermined measurement planned positions as exemplified in FIGS. 6A and 6B is input in the terminal 300 (step S102).

After the processing in steps S101 and S102 is performed, processing for guiding the operator 100 to a measurement planned position by the terminal 300 is performed (step S103). The following processing is performed in step S103. First, after a program relating to the processing that is exemplified in FIGS. 4A to 4D is started in the terminal 300, a measurement planned position 601 that should be reached first is selected from the grid points shown in FIGS. 6A and 6B. Then, a UI screen for guiding to the selected position is displayed on the display 307 of the terminal 300 as shown in FIG. 4A. The operator 100 looks at the UI screen display, as shown in FIG. 4A, and carries the illuminometer 203 to the selected measurement planned position 601, which is set in a grid. This operation is performed such that the operator walks while looking at the terminal 300 and carrying the measuring unit 200 by hand.

For example, when the screen as shown in FIG. 4A is displayed first, the operator understands the direction and the distance to the displayed measurement planned position and then walks to the displayed measurement planned position. When the measurement planned position approaches, the display screen is changed to a display screen as shown in FIG. 4B, by which a relative positional relationship between the current position and the measurement planned position is easy to visually understand. Then, the operator 100 comes closer to the measurement planned position from the condition shown in FIG. 4B, and the position of the reflective prism 202 in the horizontal plane enters an area that can be regarded as the measurement planned position. In this case, the area is an area of radius of 70 centimeters. This condition is shown in FIG. 4C.

Thereafter, the operator 100 comes further close to the selected measurement planned position in the horizontal plane from the condition shown in FIG. 4C and adjusts the height of the reflective prism 202 by correcting the length of the support pole 201. This condition is shown in FIG. 4D. FIG. 4D shows the condition in which the three-dimensional position of the reflective prism 202 enters the area of radius of 70 centimeters from the measurement planned position and in which highlighting is performed for notifying the operator of being in the area. In this embodiment, a blinking icon for instructing the illuminance measurement is displayed in the screen, thereby notifying the operator 100 of the condition, in which the reflective prism 202 (illuminometer 203) reaches the measurement planned position and the illuminance measurement can be effectively performed.

At this stage, when the operator 100 controls the terminal 300 and instructs the illuminance measurement, the illuminometer 203 measures illuminance (step S104). The data of the measured illuminance is stored in a storage file that is set in the memory of the terminal 300. In this case, the data of the illuminance is stored by being linked with coordinate data of the measured position and measurement time data (step S105). The illuminance is measured in both the vertical direction and the horizontal direction. For the measurement in the vertical direction, the direction of the illuminometer is adjusted so as to face the vehicle. For the measurement in the horizontal direction, the illuminometer is adjusted in a zenithal direction.

The above processing is performed at each of the measurement planned positions 601, which are set in a grid, in turn, whereby illuminance data at each of the measurement planned positions is obtained.

Figure 7:
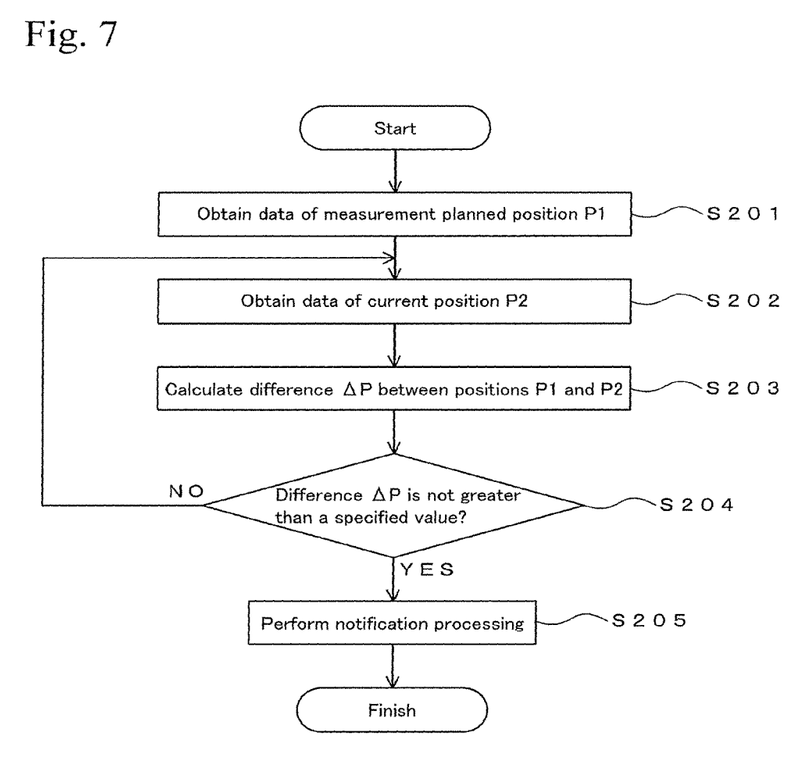
FIG. 7 is a flow chart showing an example of a processing procedure.

FIG. 7 shows an example of the processing relating to step S103. This processing is performed by the position judging unit 304 of the terminal 300. In this processing, first, position data of a measurement planned position P1 is obtained (step S201). Then, data of a measured current position P2 of the reflective prism 202 is obtained (step S202). Next, a difference (distance) ΔP between the positions P1 and P2 is calculated (step S203).

After the difference ΔP is calculated, whether the difference ΔP is not greater than a predetermined specified value (for example, 70 centimeters) is judged (step S204). If the difference ΔP is not greater than the specified value, notification processing is performed (step S205). Otherwise, the processing in step S202 and the subsequent steps is repeated.

Advantages

According to the above embodiment, a guide to a position that should be measured is displayed on the display of the terminal, whereby the operations for identifying a position of the illuminometer 203 are made efficient.

2. Second Embodiment

Outline

This embodiment relates to a technique for obtaining position data of the position measuring device 400 in the First Embodiment. In the First Embodiment, first, the position of the position measuring device 400 in the measurement field must be determined and be obtained. If the arranged position of the position measuring device 400 is preliminarily determined, the work can be performed according to the method described in the First Embodiment. Otherwise, operations for positioning the position measuring device 400 are necessary. The method described in the Second Embodiment reduces the burden of positioning the position measuring device 400 in such a case.

Structure

Figure 8:
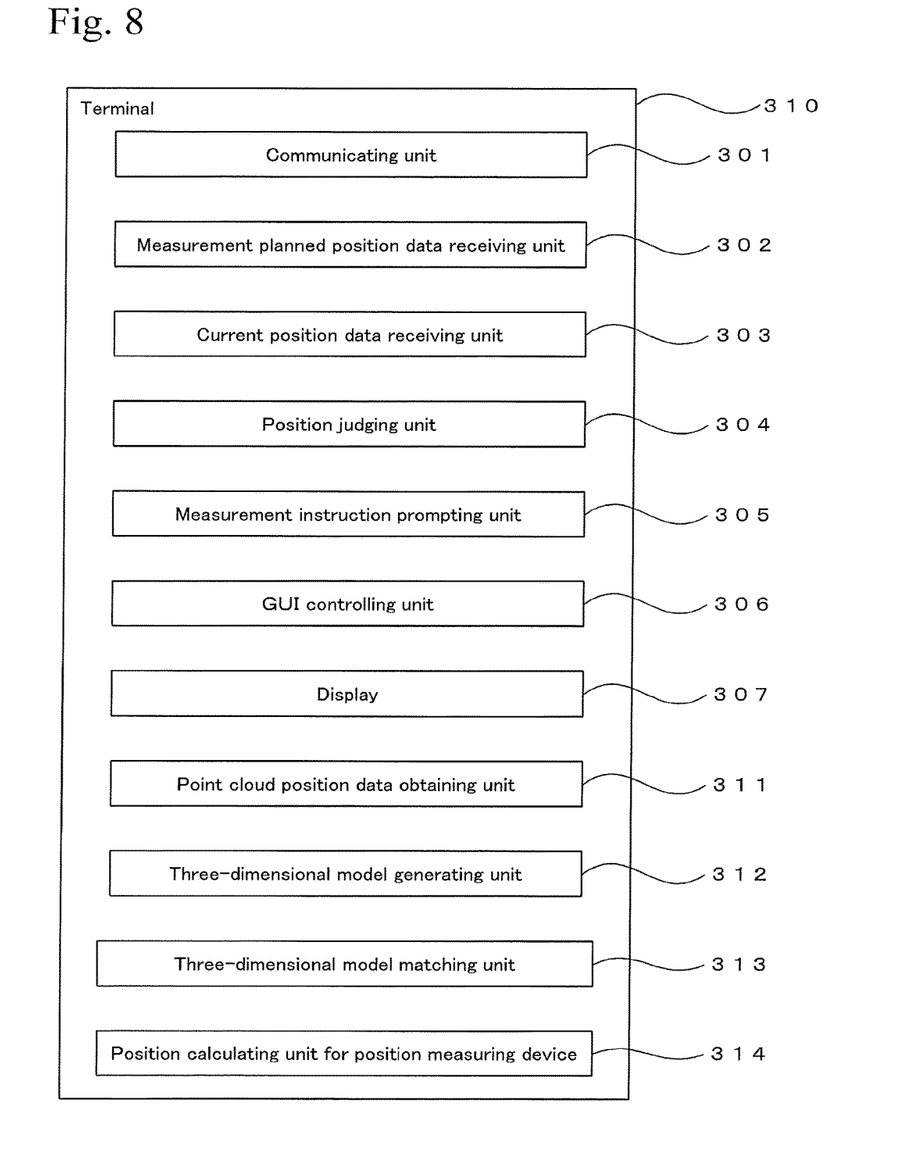
FIG. 8 is a block diagram of a terminal of an embodiment.

In this embodiment, a terminal 310 shown in FIG. 8 is used instead of the terminal 300 shown in FIG. 3. The terminal 310 is constructed by adding a point cloud position data obtaining unit 311, a three-dimensional model generating unit 312, a three-dimensional model matching unit 313, and a position calculating unit 314 for the position measuring device, to the terminal 300 shown in FIG. 3. The units shown in FIG. 8 are the same as the units shown in FIG. 3 and have the same functions as the units shown in FIG. 3. Additionally, whether each of the functional units is to be constructed of dedicated hardware or is to be constructed of software is also selected in the same way as in the case shown in FIG. 3.

In this embodiment, a position measuring device 400 having a laser scanner function is used in FIG. 2. In this case, laser light is emitted from the measurement light emitting unit 401 and is reflected at an object, and the reflected light is detected (received) by the reflected light receiving unit 402. This operation is performed at each point of the object, whereby point cloud position data of the object is obtained. Details of a laser scanner are disclosed in Japanese Unexamined Patent Application Laid-Open No. 2010-151682, for example.

The distance to the measured point, at which the measurement light hits, is determined from the flight time between the emission of the measurement light from the measurement light emitting unit 401 and the reception by the reflected light receiving unit 402. A relative position in the three-dimensional space of the measured point with respect to the position measuring device 400 is obtained from the distance to the measured point and the emitting direction of the measurement light. Specifically, a three-dimensional position of the measured point in a three-dimensional coordinate system is obtained. The three-dimensional coordinate system has an origin at the position of the position measuring device 400. This measurement is performed at each of numerous points while the object to be measured is scanned. A set (cloud) of position information of the numerous measured points is called point cloud position data. The point cloud position data is data in which the object is assumed to be constructed of a set (cloud) of points (measured points). Each of the points of the object is plotted in a three-dimensional space based on the point cloud position data, whereby a three-dimensional model of the object that is understood as being a set of points is obtained.

The point cloud position data obtaining unit 311 obtains point cloud position data, which is measured by using the laser scanner function of the position measuring device 400. The three-dimensional model generating unit 312 generates a three-dimensional model of the object based on the point cloud position data, which is obtained by the point cloud position data obtaining unit 311. Such a technique is disclosed in Japanese Unexamined Patent Applications Laid-Open Nos. 2012-230594 and 2014-035702, for example.

In this embodiment, the vehicle (passenger car) 600 shown in FIGS. 6A and 6B is selected as an object to be measured. In this case, the headlights and the taillights of the vehicle 600 shown in FIGS. 6A and 6B are examples of electromagnetic wave generation sources, and the vehicle 600 is an example of an object that has electromagnetic wave generation sources.

The three-dimensional model matching unit 313 performs processing for obtaining a matching relationship between a first three-dimensional model and a second three-dimensional model. The first three-dimensional model is a three-dimensional model of the vehicle 600, which is preliminarily prepared. The second three-dimensional model is the three-dimensional model, which is generated by the three-dimensional model generating unit 312. Details of the matching of the three-dimensional models are disclosed in PCT International Publication No. WO 2012/141235, Japanese Unexamined Patent Applications Laid-Open Nos. 2014-035702 and 2015-046128, and Japanese Patent Application No. 2015-133736, for example.

The first three-dimensional model is obtained from the design data of the vehicle 600. Here, matching relationships between the first three-dimensional model and the measurement planned positions 601 are obtained in advance. That is, since the measurement planned positions 601 are set based on the vehicle 600, the matching relationships between the three-dimensional model of the vehicle 600 and the measurement planned positions 601 are determined when the vehicle 600 is designed. The second three-dimensional model is a three-dimensional model of the vehicle 600 as viewed from the position arranged with the position measuring device 400.

Operation

Figure 9:
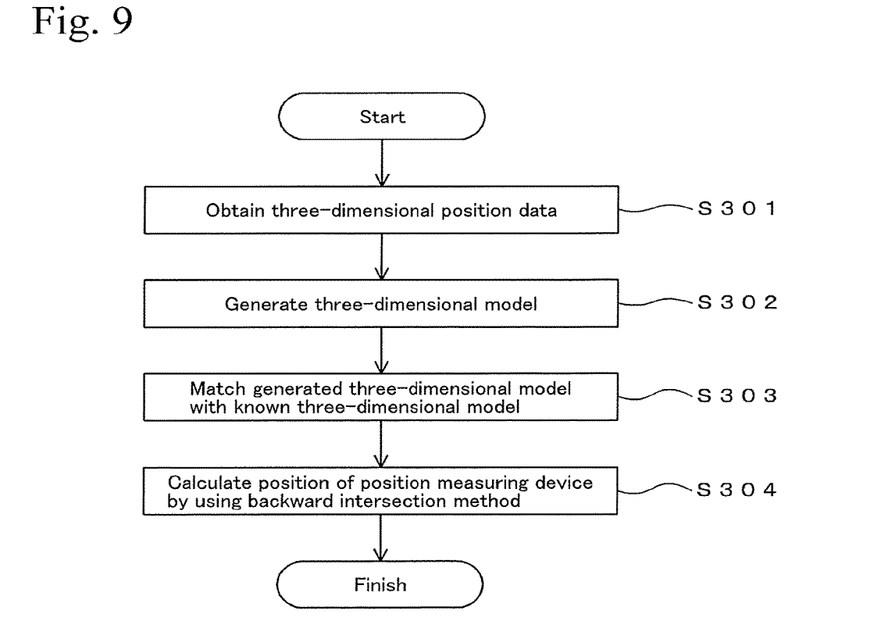
FIG. 9 is a flow chart showing an example of a processing procedure.

In this embodiment, processing for identifying the position of the position measuring device 400 in the measurement field is performed as described below. FIG. 9 shows an example of a processing procedure. In this processing, first, the position measuring device 400 is arranged at an appropriate position in the measurement field shown in FIG. 6B. At this time, the position measuring device 400 is arranged at a position from which both the vehicle 600 and the measurement planned positions 601 that are set in a grid are viewed. Coordinates of the position of the position measuring device 400 in the measurement field are not necessarily known or are not necessarily precisely known at this stage. Under this condition, the following processing is started.

First, point cloud position data of the vehicle 600 is obtained by using the laser scanner function of the position measuring device 400 (step S301). The point cloud position data may be obtained from the entirety of the area covering the vehicle 600 or may be obtained from a part of this area. Specifically, first, the vehicle 600 is scanned with laser light by using the position measuring device 400, and point cloud position data of the vehicle 600 is obtained. The point cloud position data is transmitted from the position measuring device 400 to the terminal 300 and is received by the point cloud position data obtaining unit 311 of the terminal 300.

After the point cloud position data is obtained, a three-dimensional model is generated based on this point cloud position data (step S302). The processing of this step is performed by the three-dimensional model generating unit 312. In this step, a three-dimensional model of the vehicle 600, that is, a second three-dimensional model is obtained.

After the three-dimensional model of the vehicle 600 is obtained, a matching relationship between a first three-dimensional model and a second three-dimensional model is determined (step S303). The first three-dimensional model is a three-dimensional model of the vehicle 600, which is preliminarily obtained. The second three-dimensional model is the three-dimensional model that is generated in step S302. The processing of this step is performed by the three-dimensional model matching unit 313.

After the matching relationship between the first three-dimensional model and the second three-dimensional model is determined, the position of the position measuring device 400 is calculated by using a backward intersection method (step S304). Hereinafter, details of the processing in step S304 are described.

Figure 10:
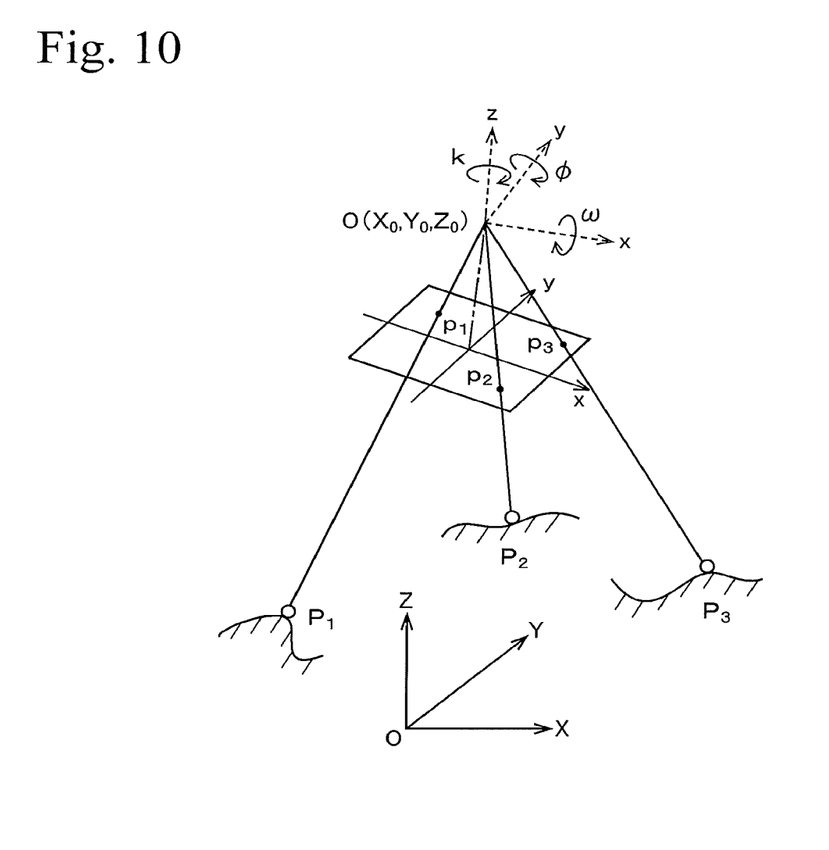
FIG. 10 shows a principle of a backward intersection method.

The principle of the backward intersection method is shown in FIG. 10. The backward intersection method is a method of observing directions from an unknown point to at least three known points and calculating the position of the unknown point as the intersection point of these directional lines. As the backward intersection method, a single photo orientation or a DLT method (Direct Linear Transformation Method) may be used. Details of the intersection method may be found in "Technology of Positioning Solutions" (published by DENKISHOIN on April, 2010) on pages 182 and 184. Additionally, a specific example of a calculation method in the intersection method is disclosed in Japanese Unexamined Patent Application Laid-Open No. 2013-186816.

For example, in the case shown in FIG. 10, the points $P_1$ to $P_3$ are selected from an area at which the first three-dimensional model and the second three-dimensional model are matched with each other. In this embodiment, the three points are obtained from points of the outside part of the vehicle 600. Regarding the second three-dimensional model, the directional lines from an unknown point O to the points $P_1$ to $P_3$ correspond to light paths of the measurement laser light. Thus, three directional lines are obtained from emitting directions of the measurement laser light for scanning the points $P_1$ to $P_3$. Then, coordinates of an intersection point of the three directional lines are calculated, whereby a relative position of the unknown point O with respect to the points $P_1$ to $P_3$ is determined.

The first three-dimensional model is obtained from known data, for example, design data of the vehicle 600. The relative positional relationships between the first three-dimensional model and the multiple measurement planned positions 601 that are set in a grid are determined in advance and are known at this stage. Thus, by determining the relative positional relationships between the points $P_1$ to $P_3$ and the unknown point O in the model shown in FIG. 10, the relative positional relationships between the multiple measurement planned positions 601 and the position measuring device 400 at the unknown point O are obtained. Consequently, the multiple measurement planned positions 601 and the position of the position measuring device 400 can be described by the same coordinate system.

Since the grid spaces between the measurement planned positions 601 are determined in advance, the grid spaces function as a scale, whereby a true scale is provided to the coordinate system for describing the measurement planned positions 601 and the position of the position measuring device 400. This coordinate system is fixed relative to the measurement field shown in FIGS. 6A and 6B and is a local coordinate system for describing the measurement planned positions 601, the position of the vehicle 600, and the position of the position measuring device 400.

According to the processing in step S304, the position of the position measuring device 400 in the measurement field shown in FIGS. 6A and 6B is identified. Under this condition, the processing described in the First Embodiment can be effectively performed, and illuminance of the lights of the vehicle 600 can be effectively measured in the measurement field shown in FIGS. 6A and 6B.

3. Other Matters

Data such as of chromaticity, wavelength distribution characteristic, or the like, may be measured in addition to the illuminance. Moreover, the present invention can be used in a technique for measuring electromagnetic waves for communication, such as radio waves of a wireless LAN, radiation such as gamma rays, light in the invisible ultraviolet region or infrared region, electromagnetic waves generated by high-voltage transmission lines or high-voltage electric equipment, etc.

In some cases, an attitude sensor may be secured on the measuring unit 200 and may be configured to output to the terminal 300. In this case, the direction of the illuminometer 203 is displayed in the screen in each of FIGS. 4A to 4D when the measuring unit 200 is rotated around a vertical axis. Accordingly, the operator 100 can know the direction of incident light, of which the illuminance can be measured.

The field where the measurement is performed is not limited to specific places and can be selected from rooms for particular work, classrooms, lecture halls, event facilities, libraries, various types of public spaces, commercial facilities, rooms for public transportation, etc.

The illuminance may be automatically measured when a predetermined condition is satisfied, while no notification processing for prompting the operator to measure illuminance is performed in step S205.

The measuring unit 200 may be fixed on an autonomous moving means, and autonomous movement of the autonomous moving means, and extension and retraction of the support pole 201, may be controlled by using control data for displaying the UI shown in FIGS. 4A to 4D. In this case, an autonomous movement controlling unit and an extension and retraction controlling unit are prepared in the terminal 300 or are prepared as separate devices. The autonomous movement controlling unit controls the movement of the autonomous moving means by using the control data for displaying the UI shown in FIGS. 4A to 4D. Also, the extension and retraction controlling unit controls the extension and retraction of the support pole 201 by using the control data for displaying the UI shown in FIGS. 4A to 4D.

A part of the functional units of the terminal 300 shown in FIG. 3 may be performed by a separate external unit. Also, a part of the functional units of the terminal 310 shown in FIG. 8 may be performed by a separate external unit. In such cases, the present invention can be understood as a system.

What is claimed is:

1. A device for measuring illuminance of illumination light, the device comprising:
   a measurement planned position data receiving unit that receives data of a three-dimensional position of a measurement planned position that is a candidate at which illuminance of the illumination light is measured by an illuminometer, which is fixed on a reflective prism;
   a position data receiving unit that receives data of a three-dimensional position of the illuminometer that is obtained by measuring a position of the reflective prism by using laser light of a position measuring device; and
   a graphical user interface controlling unit that displays a relationship between the three-dimensional position of the measurement planned position and the three-dimensional position of the illuminometer, on a display,
   wherein the graphical user interface controlling unit displays distances in a horizontal direction and a vertical direction from the three-dimensional position of the illuminometer to the three-dimensional position of the measurement planned position, on the display, as a result of comparison between the three-dimensional position of the measurement planned position and the three-dimensional position of the illuminometer.

2. The device according to claim 1, further comprising:
   a measurement instruction prompting unit that controls displaying of a notice when a distance between the measurement planned position and the three-dimensional position of the illuminometer is not greater than a predetermined value.

3. The device according to claim 1, further comprising:
   a measurement instruction prompting unit that controls displaying of a notice when a distance between the measurement planned position and the three-dimensional position of the illuminometer is not greater than a predetermined value.

4. The measuring device according to claim 1, wherein the measurement planned position is set at each positions in a grid in a three-dimensional space.

5. The measuring device according to claim 1, wherein a direction of the illuminometer is displayed on the display.

6. The measuring device according to claim 1, wherein the three-dimensional position of the illuminometer is displayed on the display.

7. A method for measuring illuminance of illumination light, the method comprising:
   receiving data of a three-dimensional position of a measurement planned position that is a candidate at which illuminance of the illumination light is measured by an illuminometer that is fixed on a reflective prism;
   receiving data of a three-dimensional position of the illuminometer that is obtained by measuring a position of the reflective prism by using laser light of a position measuring device;
   displaying a relationship between the three-dimensional position of the measurement planned position and the three-dimensional position of the illuminometer, on a display; and comparing the three-dimensional position of the measurement planned position with the three-dimensional position of the illuminometer, wherein distances in a horizontal direction and a vertical direction from the three-dimensional position of the illuminometer to the three-dimensional position of the measurement planned position are displayed on the display as a result of the comparison.

8. A computer program product comprising a non-transitory computer-readable medium storing computer-executable program codes for measuring illuminance of illumination light, the computer-executable program codes comprising program code instructions for:

receiving data of a three-dimensional position of a measurement planned position that is a candidate at which illuminance of the illumination light is measured by an illuminometer that is fixed on a reflective prism;

receiving data of a three-dimensional position of the illuminometer that is obtained by measuring a position of the reflective prism by using laser light of a position measuring device;

displaying a relationship between the three-dimensional position of the measurement planned position and the three-dimensional position of the illuminometer, on a display; and comparing the three-dimensional position of the measurement planned position with the three-dimensional position of the illuminometer, wherein distances in a horizontal direction and a vertical direction from the three-dimensional position of the illuminometer to the three-dimensional position of the measurement planned position are displayed on the display as a result of the comparison.

* * * * *